(No Model.)
R. G. S. COLLAMORE.
DOOR CHECK.
No. 272,531. Patented Feb. 20, 1883.
Fig. 1.
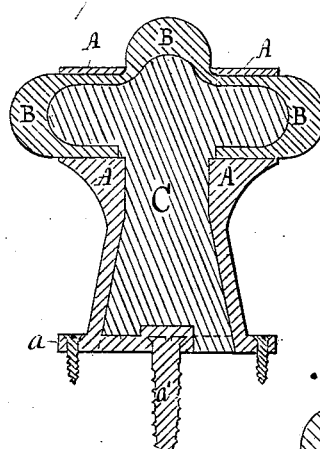
Fig. 2.
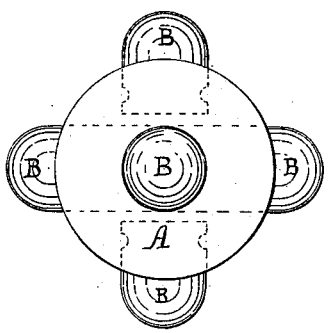
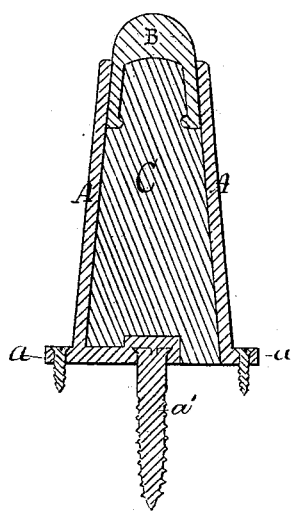
Fig. 3.
Witnesses:
G. B. Maynadier.
John R. Snow.
Inventor:
Robert G. S. Collamore
by J. E. Maynadier
his Atty
N. PETERS. Photo-Lithographer, Washington, D. C.

United States Patent Office.

ROBERT G. S. COLLAMORE, OF BOSTON, MASSACHUSETTS.

DOOR-CHECK.

SPECIFICATION forming part of Letters Patent No. 272,531, dated February 20, 1883.

Application filed October 21, 1882. (No model.)

*To all whom it may concern:*

Be it known that I, ROBERT G. S. COLLAMORE, of Boston, in the county of Suffolk and State of Massachusetts, have invented a new and useful Door-Stop, of which the following is a specification.

My invention relates to improvements in door-stops, in which a piece of rubber is secured to a hollow holder adapted to be attached to the floor or wall; and my objects are to so construct the holder that the rubber can be readily inserted and secured in place, and to provide means for holding the stop more firmly in its position.

My invention consists in making the holder hollow and securing the rubber by means of a filling of plaster-of-paris or other substance, which can be poured in and afterward harden.

In the accompanying drawings, Figure 1 is a section through a stop adapted for either the floor or the wall. Fig. 2 is a plan or top view of the stop shown in section in Fig. 1; and Fig. 3 is a section through a stop to be attached to the wall.

A is a hollow holder, of any suitable material, provided with openings, through which the rubber B protrudes. In Fig. 2 the two pieces of rubber B (shown partly in dotted lines) are held from moving in or out of the hollow holder A by the projection of a portion of the holder into the rubber, while the other piece of rubber, B, is held in place, not only by the shape of the rubber and the hollow holder, but also by a filling, C. I use for a filling a material—such as plaster-of-paris—which, when liquid, will fill all parts of the interior of the holder and the concavities of the rubber, and which will harden and securely hold the rubber in place; or I substitute any material which will run and harden and hold the rubber in place. The usual holding-screw, $a'$, is secured in a boss supported by cross-bars on the bottom of the holder A. A flange, $a$, is made on the bottom of the holder A, and provided with holes to receive screws or the like.

It has been found in practice that where only one screw was depended upon to secure the stop in place it was readily unscrewed, and also liable to work loose. In hotels and other public places much annoyance has been caused by the door-stops being stolen.

I claim as my invention—

In combination with the hollow holder A and rubber B, the filling C, of plaster-of-paris or like material, which may be poured in and afterward harden, substantially as and for the purpose specified.

ROBERT G. S. COLLAMORE.

Witnesses:
  J. E. MAYNADIER,
  JOHN R. SNOW.